US006226614B1

(12) United States Patent
Mizuno et al.

(10) Patent No.: US 6,226,614 B1
(45) Date of Patent: May 1, 2001

(54) METHOD AND APPARATUS FOR EDITING/ CREATING SYNTHETIC SPEECH MESSAGE AND RECORDING MEDIUM WITH THE METHOD RECORDED THEREON

(75) Inventors: Osamu Mizuno; Shinya Nakajima, both of Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/080,268

(22) Filed: May 18, 1998

(30) Foreign Application Priority Data

May 21, 1997 (JP) .................................................. 9-131109
Sep. 11, 1997 (JP) .................................................. 9-247270
Nov. 11, 1997 (JP) .................................................. 9-308436

(51) Int. Cl.[7] ............................ G10L 13/08; G06F 17/24
(52) U.S. Cl. .......................... 704/260; 704/258; 704/266
(58) Field of Search .................................... 704/258, 260, 704/266

(56) References Cited

U.S. PATENT DOCUMENTS 4,907,279 3/1990 Higuchi et al. ...................... 704/260
5,559,927 9/1996 Clynes ................................ 704/258
5,642,466 * 6/1997 Narayan .............................. 704/260
5,652,828 * 7/1997 Silverman ........................... 704/260
5,732,395 * 3/1998 Silverman ........................... 704/260
5,749,071 * 5/1998 Silverman ........................... 704/260
5,832,435 * 11/1998 Silverman ........................... 704/260
5,860,064 * 1/1999 Henton ................................ 704/260
5,890,117 * 3/1999 Silverman ........................... 704/260

FOREIGN PATENT DOCUMENTS 2119397 9/1994 (CA) .............................. G10L/9/00
0 762 384 3/1997 (EP) .............................. G10L/5/04

OTHER PUBLICATIONS

Jun Sato and Shigeo Morishima, "Emotion Modeling in Speech Production using Emotion Space," Proc. 5th IEEE International Workshop on Robot and Human Communication, p. 472–476, Sep. 1996.*

Iain R. Murray and John L. Arnott, "Synthesizing Emotions in Speech: Is it Time to Get Excited?", Proc. ICSLP 96, p. 1816–1819, Oct. 1996.*

D. Galanis, V. Darsinos, and G. Kokkinakis, "Investigating Emotional Speech Parameters for Speech Synthesis," Proc. IEEE ICECS 96, p. 1227–1230, Oct. 1996.*

* cited by examiner

*Primary Examiner*—Tālivaldis I. Ŝmits
(74) *Attorney, Agent, or Firm*—Pollock, Vande Sande & Amernick

(57) ABSTRACT

A three-layered prosody control description language is used to insert prosodic feature control commands in a text at the positions of characters or a character string to be added with non-verbal information. The three-layered prosody control description language is composed of: a semantic layer (S layer) having, as its prosodic feature control commands, control commands each represented by a word indicative of the meaning of non-verbal information; an interpretation layer (I layer) having, as its prosodic feature control commands, control commands which interpret the prosodic feature control commands of the S layer and specify control of prosodic parameters of speech; and a parameter layer (P layer) having prosodic parameters which are objects of control by the prosodic feature control commands of the I layer. The text is converted into a prosodic parameter string through synthesis-by-rule. The prosodic parameters corresponding to characters or character string to be corrected are corrected by the prosodic feature control commands of the I layer, and speech is synthesized from a parameter string containing the corrected prosodic parameters.

13 Claims, 10 Drawing Sheets

FIG. 5

| PITCH PATTERN MODIFICATION | SPEAKER'S MENTAL STATES | RESPONSE "PERCEIVED" [ % ] |
|---|---|---|
| DYNAMIC RANGE ENLARGED | STRONG-WILLED, AGGRESSIVE | 100 |
| DYNAMIC RANGE NARROWED | TIMID, PASSIVE | 86 |
| WORD-FINAL PATTERN DECLINING | UNDERSTANDING OR AGREED | 86 |
| WORD-FINAL PATTERN RISING | QUESTIONING | 100 |
| UPWARDLY PROJECTING FROM BEGINNING TO PEAK | SECURE | 86 |
| DOWNWARDLY PROJECTING FROM BEGINNING TO PEAK | INSECURE | 71 |

FIG. 6

| UTTERANCE DURATION | SPEAKER'S MENTAL STATES | RESPONSE "PERCEIVED" [ % ] |
|---|---|---|
| LENGTHENED | SPEAKING CLEARLY | 100 |
| | SPEAKING SUGGESTIVELY | 57 |
| SHORTENED | HURRIED | 86 |
| | PROMPTING | 57 |

FIG. 7

| PITCH PATTERN | UTTERANCE DURATION | MAIN IMPRESSIONS [%] |
| --- | --- | --- |
| DYNAMIC RANGE ENLARGED (STRONG-WILLED AGGRESSIVE) | LENGTHENED | PERSUASIVE OR ADMONISHING(57%) |
| | SHORTENED | HURRIED ( 57%) |
| DYNAMIC RANGE NARROWED (TIMID, PASSIVE) | LENGTHENED | UNWILLING (57%) |
| | SHORTENED | CALM,UNEMOTIONAL (57%) |
| WORD-FINAL PATTERN DECLINING (UNDERSTANDING OR AGREED) | LENGTHENED | RESIGNED (43%) UNSENTIMENTAL(57%) |
| | SHORTENED | TOLERANT (71%) |
| WORD-FINAL PATTERN RISING (QUESTIONING) | LENGTHENED | IRRITATED (71%) |
| | SHORTENED | HURRIED (43%) |
| UPWARDLY PROJECTING FROM BEGINNING TO PEAK (SECURE) | LENGTHENED | SOOTHING (43%) |
| | SHORTENED | FRANK (43%) |
| DOWNWARDLY PROJECTING FROM BEGINNING TO PEAK (INSECURE) | LENGTHENED | UNWILLING (71%) |
| | SHORTENED | FRANK (43%) |

METHOD AND APPARATUS FOR EDITING/CREATING SYNTHETIC SPEECH MESSAGE AND RECORDING MEDIUM WITH THE METHOD RECORDED THEREON

BACKGROUND OF THE INVENTION

The present invention relates to a method and apparatus for editing/creating synthetic speech messages and a recording medium with the method recorded thereon. More particularly, the invention pertains to a speech message editing/creating method that permits easy and fast synthesization of speech messages with desired prosodic features.

Dialogue speech conveys speaker's mental states, intentions and the like as well as the linguistic meaning of spoken dialogue. Such information contained in the speaker's voices, except their linguistic meaning, is commonly referred to as non-verbal information. The hearer takes in the non-verbal information from the intonation, accents and duration of the utterance being made. There has heretofore been researched and developed, as what is called a TTE (Text-To-Speech) message synthesis method, a "speech synthesis-by-rule" that converts a text to speech form. Unlike in the case of editing and synthesizing recorded speech, this method places no particular limitations on the output speech and settles the problem of requiring the original speaker's voice for subsequent partial modification of the message. Since the prosody generation rules used are based on prosodic features of speech made in a recitation tone, however, it is inevitable that the synthesized speech becomes recitation-type and hence is monotonous. In natural conversations the prosodic features of dialogue speech often significantly vary with the speaker's mental states and intentions.

With a view to making the speech synthesized by rule sound more natural, an attempt has been made to edit the prosodic features, but such editing operations are difficult to automate; conventionally, it is necessary for a user to perform edits based on his experience and knowledge. In the edits it is hard to adopt an arrangement or configuration for arbitrarily correcting prosodic parameters such as intonation, fundamental frequency (pitch), amplitude value (power) and duration of an utterance unit desired to synthesize. Accordingly, it is difficult to obtain a speech message with desired prosodic features by arbitrarily correcting prosodic or phonological parameters of that portion in the synthesized speech which sounds monotonous and hence recitative.

To facilitate the correction of prosodic parameters, there has also been proposed a method using GUI (graphic user interface) that displays prosodic parameters of synthesized speech in graphic form on a display, visually corrects and modifies them using a mouse or similar pointing tool and synthesizes a speech message with desired non-verbal information while confirming the corrections and modifications through utilization of the synthesized speech output. Since this method visually corrects the prosodic parameters, however, the actual parameter correcting operation requires experience and knowledge of phonetics, and hence is difficult for an ordinary operator.

In any of U.S. Pat. No. 4,907,279 and Japanese Patent Application Laid-Open Nos. 5-307396, 3-189697 and 5-19780 there is disclosed a method that inserts phonological parameter control commands such as accents and pauses in a text and edits synthesized speech through the use of such control commands. With this method, too, the non-verbal information editing operation is still difficult for a person who has no knowledge about the relationship between the non-verbal information and prosody control.

SUMMARY OF THE INVENTION

It is therefore an object of the present invention to provide a synthetic speech editing/creating method and apparatus with which it is possible for an operator to easily synthesize a speech message with desired prosodic parameters.

Another object of the present invention is to provide a synthetic speech editing/creating method and apparatus that permit varied expressions of non-verbal information which is not contained in verbal information, such as the speaker's mental states, attitudes and the degree of understanding.

Still another object of the present invention is to provide a synthetic speech message editing/creating method and apparatus that allow ease in visually recognizing the effect of prosodic parameter control in editing non-verbal information of a synthetic speech message.

According to a first aspect of the present invention, there is provided a method for editing non-verbal information of a speech message synthesized by rules in correspondence to a text, the method comprising the steps of:

(a) inserting in the text, at the position of a character or character string to be added with non-verbal information, a prosodic feature control command of a semantic layer (hereinafter referred to as an S layer) and/or an interpretation layer (hereinafter referred to as an I layer) of a multi-layered description language so as to effect prosody control corresponding to the non-verbal information, the multi-layered description language being composed of the S and I layers and a parameter layer (hereinafter referred to as a P layer), the P layer being a group of controllable prosodic parameters including at least pitch and power, the I layer being a group of prosodic feature control commands for specifying details of control of the prosodic parameters of the P layer, the S layer being a group of prosodic feature control commands each represented by a phrase or word indicative of an intended meaning of non-verbal information, for executing a command set composed of at least one prosodic feature control command of the I layer, and the relationship between each prosodic feature control command of the S layer and a set of prosodic feature control commands of the I layer and prosody control rules indicating details of control of the prosodic parameters of the P layer by the prosodic feature control commands of the I layer being prestored in a prosody control rule database;

(b) extracting from the text a prosodic parameter string of speech synthesized by rules;

(c) controlling that one of the prosodic parameters of the prosodic parameter string corresponding to the character or character string to be added with the non-verbal information, by referring to the prosody control rules stored in the prosody control rule database; and (d) synthesizing speech from the prosodic parameter string containing the controlled prosodic parameter and for outputting a synthetic speech message.

A synthetic speech message editing apparatus according to the first aspect of the present invention comprises:

a text/prosodic feature control command input part into which a prosodic feature control command to be inserted in an input text is input, the phonological control command being described in a multi-layered description language composed of semantic, interpretation and parameter layers (hereinafter referred to simply as an S, an I and a P layer, respectively), the P layer being a group of controllable prosodic parameters including at least pitch and power, the I layer being a group of prosodic feature control commands for specifying details of control of the prosodic parameters of the P layer, and the S layer being a group of prosodic feature control commands each represented by a phrase or word indicative of an intended meaning of non-verbal information, for executing a command set composed of at least one prosodic feature control command of the I layer;

a text/prosodic feature control command separating part for separating the prosodic feature control command from the text;

a speech synthesis information converting part for generating a prosodic parameter string from the separated text based on a "synthesis-by-rule" method;

a prosodic feature control command analysis part for extracting, from the separated prosodic feature control command, information about its position in the text;

a prosodic feature control part for controlling and correcting the prosodic parameter string based on the extracted position information and the separated prosodic feature control command; and speech synthesis part for generating synthetic speech based on the corrected prosodic parameter string from the prosodic feature control part.

According to a second aspect of the present invention, there is provided a method for editing non-verbal information of a speech message synthesized by rules in correspondence to a text, the method comprising the steps of:

(a) extracting from the text a prosodic parameter string of speech synthesized by rules;

(b) correcting that one of prosodic parameters of the prosodic parameter string corresponding to the character or character string to be added with the non-verbal information, through the use of at least one of prosody control rules defined by prosodic features characteristic of a plurality of predetermined pieces of non-verbal information, respectively; and (c) synthesizing speech from the prosodic parameter string containing the corrected prosodic parameter and for outputting a synthetic speech message.

A synthetic speech message editing apparatus according to the second aspect of the present invention comprises:

syntactic structure analysis means for extracting from the text a prosodic parameter string of speech synthesized by rules;

prosodic feature control means for correcting that one of the prosodic parameters of the prosodic parameter string corresponding to the character or character string to be added with the non-verbal information, through the use of at least one of prosody control rules defined by prosodic features characteristic of a plurality of predetermined pieces of non-verbal information, respectively; and synthetic speech generating means for synthesizing speech from the prosodic parameter string containing the corrected prosodic parameter and for outputting a synthetic speech message.

According to a third aspect of the present invention, there is provided a method for editing non-verbal information of a speech message synthesized by rules in correspondence to a text, the method comprising the steps of:

(a) analyzing the text to extract therefrom a prosodic parameter string based on synthesis-by-rule speech;

(b) correcting that one of prosodic parameters of the prosodic parameter string corresponding to the character or character string to be added with the non-verbal information, through the use of modification information based on a prosodic parameter characteristic of the non-verbal information;

(c) synthesizing speech by the corrected prosodic parameter;

(d) converting the modification information of the prosodic parameter to character conversion information such as the position, size, typeface and display color of each character in the text; and (e) converting the characters of the text based on the character conversion information and displaying them accordingly.

A synthetic speech editing apparatus according to the third aspect of the present invention comprises:

input means for inputting synthetic speech control description language information;

separating means for separating the input synthetic speech control description language information to a text and a prosodic feature control command;

command analysis means for analyzing the content of the separated prosodic feature control command and information of its position on the text;

first database with speech synthesis rules stored therein;

syntactic structure analysis means for generating a prosodic parameter for synthesis-by-rule speech, by referring to the first database;

a second database with prosody control rules of the prosodic feature control command stored therein;

prosodic feature control means for modifying the prosodic parameter based on the analyzed prosodic feature control command its positional information by referring to the second database;

synthetic speech generating means for synthesizing the text into speech, based on the modified prosodic parameter;

a third database with the prosodic parameter and character conversion rules stored therein;

character conversion information generating means for converting the modified prosodic parameter to character conversion information such as the position, size, typeface and display color of each character of the text, by referring to the third database;

character converting means for converting the character of the text based on the character conversion information; and a display for displaying thereon the converted text.

In the editing apparatus according to the third aspect of the invention, the prosodic feature control command and the character conversion rules may be stored in the third database so that the text is converted by the character conversion information generating means to character conversion information by referring to the third database based on the prosodic feature control command.

Recording media, on which procedures of performing the editing methods according to the first, second and third aspects of the present invention are recorded, respectively, are also covered by the invention.

BRIEF DESCRIPTION OF THE DRAWINGS

FIG. 5 is a table showing the results of hearing tests on synthetic speech messages with modified pitch contours in the second embodiment;

FIG. 6 is a table showing the results of hearing tests on synthetic speech messages with scaled utterance durations in the second embodiment;

FIG. 7 is a table showing the results of hearing tests on synthetic speech messages having, in combination, modified pitch contours and scaled utterance durations in the second embodiment;

DETAILED DESCRIPTION OF THE PREFERRED EMBODIMENT

First Embodiment

In spontaneous conversations the speaker changes the stress, speed and pitch of his utterances so as to express various information which are not contained in verbal information, such as his mental states, attitudes and understanding, and his intended nuances. This makes the spoken dialogue expressive and sound natural. In the synthesis-by-rule speech from a text, too, attempts are being made to additionally provide desired non-verbal information. Since these attempts each insert in the text a command for controlling phonological information of a specific kind, a user is required to have knowledge about verbal information.

In the case of using a text-to-speech synthesis apparatus to convey information or nuances that everyday conversations have, close control of prosodic parameters of synthetic speech is needed. On the other hand, it is impossible for the user to guess how the pitch or duration will affect the communication of information or nuances of speech unless he has knowledge about speech synthesis or a text-to-speech synthesizer. Now, a description will be given first of the Multi-Layered Speech/Sound Synthesis Control Language (MSCL) according to the present invention intended for ease of usage by the user.

The ease of usage by the user is roughly divided into two. First, it is ease of usage intended for beginners which enables them to easily describe a text input into the text-to-speech synthesizer even if they have no expert knowledge. In HTML that defines the relationship between the size and position of each character in the Internet, the characters can be displayed in a size according to the length of a sentence, by surrounding the character string, for example, with <H1> and </H1> called tags; anyone can create the same home page. Such a default rule is not only convenient for beginners but also leads to reduction in the describing workload. Second, it is ease of usage intended for skilled users which permits description of close control. The above-mentioned method cannot change the character shape and writing direction. Even as for the character string, for instance, there arises a need for varying it in many ways when it is desired to prepare an attention-seeking home page. It may sometimes be desirable to realize synthetic speech with higher degree of completeness even if expert knowledge is required.

Figure 1:
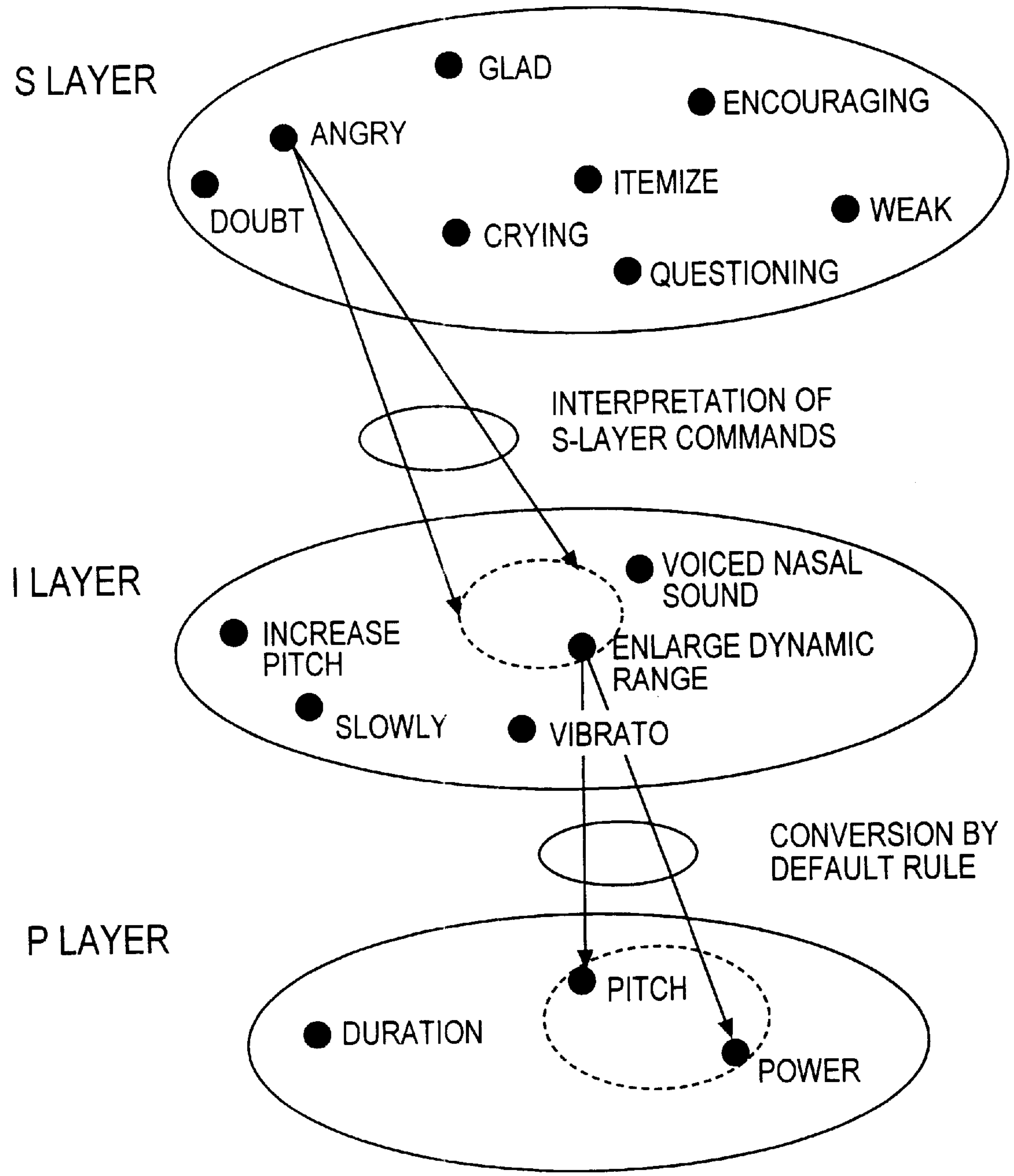
FIG. 1 is a diagram for explaining an MSCL (Multi-Layered Speech/Sound Synthesis Control Language) description scheme in a first embodiment of the present invention.

From a standpoint of controlling non-verbal information of speech, a first embodiment of the present invention uses, as a means for implementing the first-mentioned ease of usage, a Semantic level layer (hereinafter referred to as an S layer) composed of semantic prosodic feature control commands that are words or phrases each directly representing non-verbal information and, as a means for implementing the second-mentioned ease of usage, an Interpretation level layer (hereinafter referred to as an I layer) composed of prosodic feature control commands for interpreting each prosodic feature control command of the S layer and for defining direct control of prosodic parameters of speech. Furthermore, this embodiment employs a Parameter level layer (hereinafter referred to as a P layer) composed of prosodic parameters that are placed under the control of the control commands of the I layer. The first embodiment inserts the prosodic feature control commands in a text through the use of a prosody control system that has the three layers in multi-layered form as depicted in FIG. 1.

The P layer is composed mainly of prosodic parameters that are selected and controlled by the prosodic feature control commands of the I layer described next. These prosodic parameters are those of prosodic features which are used in a speech synthesis system, such as the pitch, power, duration and phoneme information for each phoneme. The prosodic parameters are ultimate objects of prosody control by MSCL, and these parameters are used to control synthetic speech. The prosodic parameters of the P layer are basic parameters of speech and have an interface-like property that permits application of the synthetic speech editing technique of the present invention to various other speech synthesis or speech coding systems that employ similar prosodic parameters. The prosodic parameters of the P layer use the existing speech synthesizer, and hence they are dependent on its specifications.

The I layer is composed of commands that are used to control the value, time-varying pattern (a prosodic feature) and accent of each prosodic parameter of the P layer. By close control of physical quantities of the prosodic parameters at the phoneme level through the use of the commands of the I layer, it is possible to implement such commands as “vibrato”, “voiced nasal sound”, “wide dynamic range”, “slowly” and “high pitch” as indicated in the I layer command group in FIG. 1. To this end, descriptions by symbols, which control patterns of the corresponding prosodic parameters of the P layer, are used as prosodic feature control commands of the I layer. The prosodic feature control commands of the I layer are mapped to the prosodic parameters of the P layer under predetermined default control rules. The I layer is used also as a layer that interprets the prosodic feature control commands of the S layer and indicates a control scheme to the P layer. The I-layer commands have a set of symbols for specifying control of one or more prosodic parameters that are control objects in the P layer. These symbols can be used also to specify the time-varying pattern of each prosody and a method for interpolating it. Every command of the S layer is converted to a set of I-layer commands—this permits closer prosody control. Shown below in Table 1 are examples of the I-layer commands, prosodic parameters to be controlled and the contents of control.

TABLE 1

I-layer commands

| Commands | Parameters | Effects |
|---|---|---|
| [L] (6 mora) {XXXX} | Duration | Changed to 6 mora |
| [A] (2.0) {XX} | Power | Amplitude doubled |
| [P] (120 Hz) {XXXX} | Pitch | Changed to 120 Hz |
| [/−\|\] (2.0) {XXXX} | Time-varying pattern | Pitch raised, flattened and lowered |
| [F0d] (2.0) {XXXX} | Pitch range | Pitch range doubled |

One or more prosodic feature control commands of the I layer may be used to correspond with to a selected one of the prosodic feature control commands of the S layer. Symbols for describing the I-layer commands used here will be described later on; XXXX in the braces { } represent a character or character string of a text that is a control object.

A description will be given of an example of application of the—layer prosodic feature control commands to English text.

Will you do [FOd](2.0){me}a[~/]{favor}.

The command [FOd] sets the dynamic range of pitch at a value double designated by (2.0) subsequent to the command. The object of control by this command is {me} immediately following it. The next command [~/] is one that raises the pitch pattern of the last vowel, and its control object is {favor} right after it.

The S layer effects prosody control semantically. The S layer is composed of words which concretely represent non-verbal information desired to express, such as the speaker's mental state, mood, intention, character, sex and age—for instance, "Angry", "Glad", "Weak", "Cry", "Itemize" and "Doubt" indicated in the S layer in FIG. 1. These words are each preceded by a mark "@", which is used as the prosodic feature control command of the S layer to designate prosody control of the character string in the braces { } following the command. For example, the command for the "Angry" utterance enlarges the dynamic ranges of the pitch and power and the command for the "Crying" utterance shakes or sways the pitch pattern of each phoneme, providing a characteristic sentence-final pitch pattern. The command "Itemize" is a command that designates the tone of reading-out items concerned and does not raise the sentence-final pitch pattern even in the case of a questioning utterance. The command "Weak" narrows the dynamic ranges of the pitch and power, the command "Doubt" raises the word-final pitch. These examples of control are in the case where these commands are applied to the editing of Japanese speech. As described above, the commands of the S layer are each used to execute one or more prosodic feature control commands of the I layer in a predetermined pattern. The S layer permits intuition-dependent control descriptions, such as speaker's mental states and sentence structures, without requiring knowledge about the prosody and other phonetic matters. It is also possible to establish correspondence between the commands of the S layer and HTML, LaTeX and other commands.

The following table shows examples of usage of the prosodic feature control commands of the S layer.

TABLE 2

S-layer commands

| Meaning | Examples of use of commands |
|---|---|
| Negative | @Negative {I don't want to go to school.} |
| Surprised | @Surprised {What's wrong?} |
| Positive | @Positive {I'll be absent today.} |
| Polite | @Polite {All work and no play makes Jack a dull boy.} |
| Glad | @Glad {You see.} |
| Angry | @Angry {Hurry up and get dressed!} |

Figure 2:
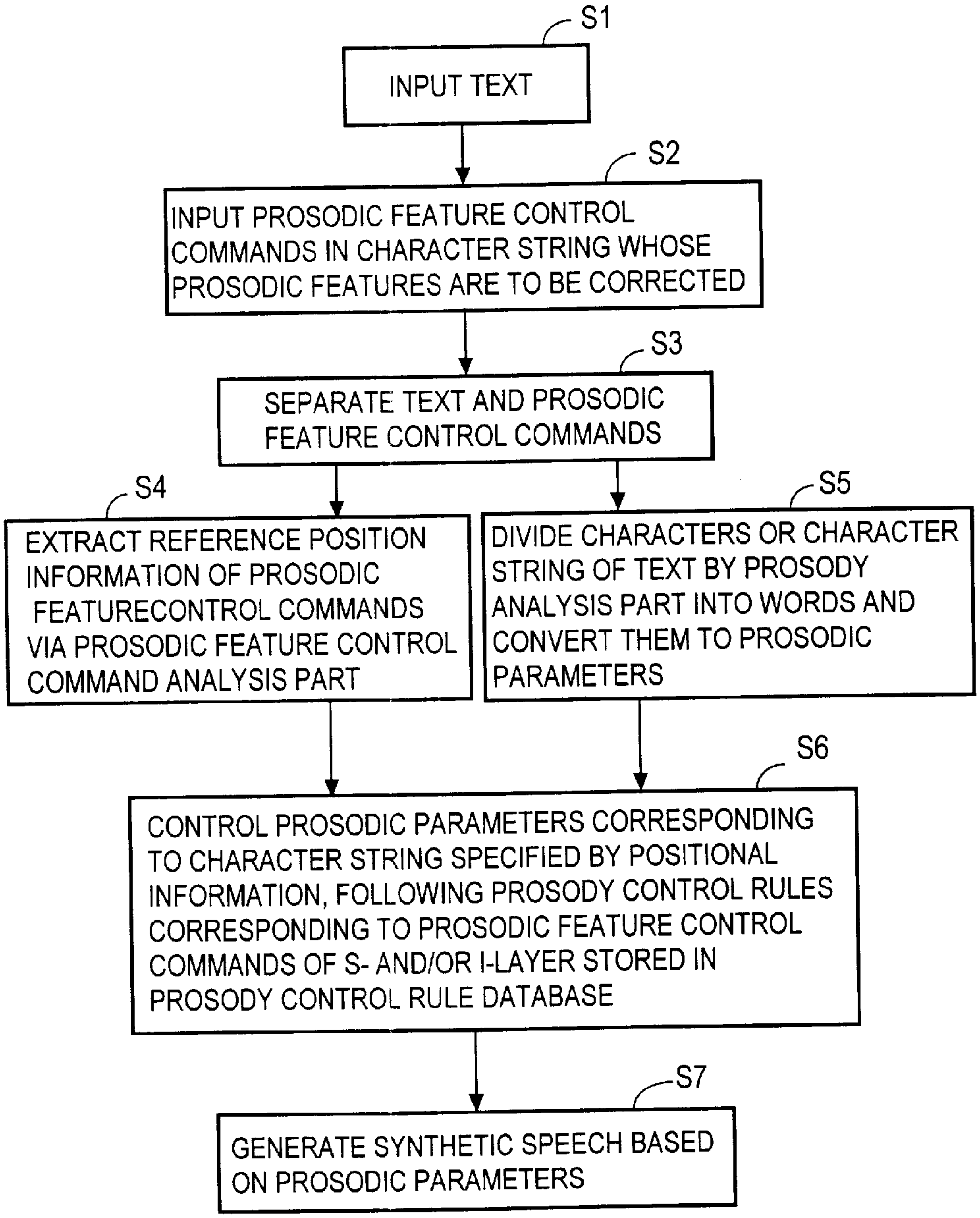
FIG. 2 is a flowchart showing a synthetic speech editing procedure involved in the first embodiment.
Figure 3:
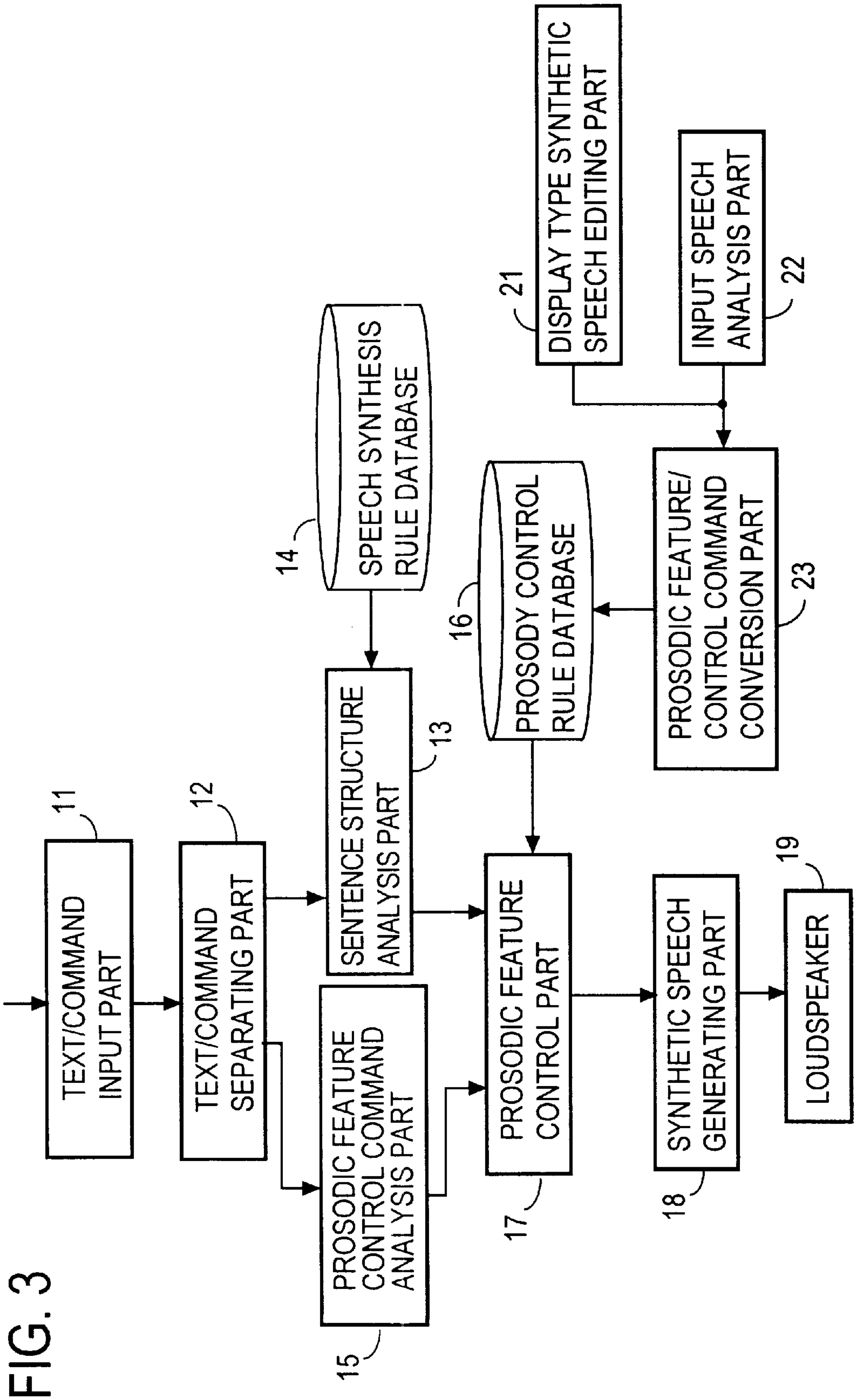
FIG. 3 is a block diagram illustrating a synthetic speech editing apparatus according to the first embodiment.

Referring now to FIGS. 2 and 3, an example of speech synthesis will be described below in connection with the case where the control commands to be inserted in a text are the prosodic features control commands of the S layer.

S1: A Japanese text, which corresponds to the speech message desired to synthesize and edit, is input through a keyboard or some other input unit.

S2: The characters or character strings desired to correct their prosodic features are specified and the corresponding prosodic feature control commands are input and inserted in the text.

S3: The text and the prosodic feature control commands are both input into a text/command separating part 12, wherein they are separated from each other. At this time, information about the positions of the prosodic feature control commands in the text is also provided.

S4: The prosodic feature control commands are then analyzed in a prosodic feature control command analysis part 15 to extract therefrom the control sequence of the commands.

S5: In a sentence structure analysis part 13 the character string of the text is decomposed into a significant word string having a meaning, by referring to a speech synthesis rule database 14. This is followed by obtaining a prosodic parameter of each word with respect to the character string.

S6: A prosodic feature control part 17 refers to the prosodic feature control commands, their positional information and control sequence, and controls the prosodic parameter string corresponding to the character string to be controlled, following the prosody control rules corresponding to individually specified I-layer prosodic feature control commands prescribed in a prosodic feature rule database 16 or the prosody control rules corresponding to the set of I-layer prosodic feature control commands specified by those of the S-layer.

S7: A synthetic speech generation part 18 generates synthetic speech based on the controlled prosodic parameters.

Turning next to FIG. 3, an embodiment of the synthetic speech editing unit will be described in concrete terms. A Japanese text containing prosodic feature control commands is input into a text/command input part 11 via a keyboard or some other editor. Shown below is a description of, for example, a Japanese text "Watashino Namaeha Nakajima desu. Yoroshiku Onegaishimasu." (meaning "My name is Nakajima. How do you do.") by a description scheme using the I and S layers of MSCL.

[L](8500 ms){
 [>](150, 80){[/-\](120){Watashino Namaeha}}
 [#](1 mora)[/](250){[L](2 mora){Na}kajima}[\]{desu.}
 [@Asking]{Yoroshiku Onegaishimasu.}

In the above, [L] indicates the duration and specifies the time of utterance of the phrase in the corresponding braces { }. [>] represents a phrase component of the pitch and indicates that the fundamental frequency of utterance of the character string in the braces { } is varied from 150 Hz to 80 Hz. [/-\] shows a local change of the pitch. /, - and \ indicate that the temporal variation of the fundamental frequency is raised, flattened and lowered, respectively. Using these commands, it is possible to describe time-variation of parameters. As regards {Watashino Namaeha}(meaning "My name"), there is further inserted or nested in the prosodic feature control command [>](150, 80) specifying the variation of the fundamental frequency from 150 Hz to 80 Hz, the prosodic feature control command [/-\](120) for locally changing the pitch. [#] indicates the insertion of a silent period in the synthetic speech. The silent period in this case is 1 mora, where "mora" is an average length of one syllable. [@Asking] is a prosodic feature control command of the S layer; in this instance, it has a combination of prosodic feature control commands as prosodic parameter of speech as in the case of "praying".

The above input information is input into the text/command separating part (usually called lexical analysis part) 12, wherein it is separated into the text and the prosodic feature control command information, which are fed to the sentence structure analysis part 13 and the prosodic feature control command analysis part 15 (usually called parsing part), respectively. By referring to the speech synthesis rule database 14, the text provided to the sentence structure analysis part 13 is converted to phrase delimit information, utterance string information and accent information based on a known "synthesis-by-rule" method, and these pieces of information are converted to prosodic parameters. The prosodic feature control command information fed to the command analysis part 15 is processed to extract therefrom the prosodic feature control commands and the information about their positions in the text. The prosodic feature control commands and their positional information are provided to the prosodic feature control part 17. The prosodic feature control part 17 refers to a prosodic feature rule database 16 and gets instructions specifying which and how prosodic parameters in the text are controlled; the prosodic parameter control part 17 varies and corrects the prosodic parameters accordingly. This control by rule specifies the speech power, fundamental frequency, duration and other prosodic parameters and, in some cases, specifies the shapes of time-varying patterns of the prosodic parameters as well. The designation of the prosodic parameter value falls into two: relative control for changing and correcting, in accordance with a given ratio or a differene, the prosodic parameter string obtained from the text by the "synthesis-by-rule", and absolute control for designating absolute values of the parameters to be controlled An example of the former is the command [FOd](2.0) for doubling the pitch frequency and an example of the latter is the command [>](150, 80) for changing the pitch frequency from 150 Hz to 80 Hz.

In the prosodic feature rule database 16 there are stored rules that provide information as to how to change and correct the prosodic parameters in correspondence to each prosodic feature control command. The prosodic parameters of the text, controlled in the prosodic feature control part 17, are provided to the synthetic speech generation part 18, wherein they are rendered into a synthetic speech signal, which is applied to a loudspeaker 19.

Voices containing various pieces of non-verbal information represented by the prosodic feature control commands of the S layer, that is, voices containing various expressions of fear, anger, negation and so forth corresponding to the S-layer prosodic feature control commands are pre-analyzed in an input speech analysis part 22. Combinations of common prosodic features (combinations of patterns of pitch, power and duration, which combinations will hereinafter be referred to as prosody control rules or prosodic feature rules) obtained for each kind by the pre-analysis are each provided, as a set of I-layer prosodic feature control commands corresponding to each S-layer command, by a prosodic feature-to-control command conversion part 23. The S-layer commands and the corresponding I-layer command sets are stored as prosodic feature rules in the prosodic feature rule database 16.

The prosodic feature patterns once stored in the prosodic feature rule database 16 are selectively read out therefrom into the prosodic feature-to-control command conversion part 23 by designating a required one of the S-layer commands. The read-out prosodic feature pattern is displayed on a display type synthetic speech editing part 21. The prosodic feature pattern can be updated by correcting the corresponding prosodic parameter on the display screen through GUI and then writing the corrected parameter into the prosodic feature rule database 16 from the conversion part 23. In the case of storing the prosodic feature control commands, obtained by the prosodic feature-to-control command conversion part 23, in the prosodic feature rule database 16, a user of the synthetic speech editing apparatus of the present invention may also register a combination of frequently used I-layer prosodic feature control commands under a desired name as one new command of the S layer. This registration function avoids the need for obtaining synthetic speech containing non-verbal information through the use of many prosodic feature control commands of the I layer whenever the user requires the non-verbal information unobtainable with the prosodic feature control commands of the S layer.

The addition of non-verbal information to synthetic speech using the Multi-layered Speech/Sound Synthesis Control Language (MSCL) according to the present invention is done by controlling basic prosodic parameters that any language has have. It is common to all of the languages that prosodic features of voices vary with the speaker's mental states, intentions and so forth. Accordingly, it is evident that the MSCL according to the present invention is applicable to the editing of synthetic speech in any kind of language.

Since the prosodic feature control commands are written in the text, using the multi-layered speech/sound synthesis control language comprised of the Semantic, Interpretation and Parameter layers as described above, an ordinary operator can also edit non-verbal information easily through utilization of the description by the S-layer prosodic feature control commands. On the other hand, an operator equipped with expert knowledge can perform more detailed edits by using the prosodic feature control commands of the S and I layers.

With the above-described MSCL system, it is possible to designate some voice qualities of high to low pitches, in addition to male and female voices. This is not only to simply change the value of the pitch or fundamental frequency of synthetic speech but also to change the entire spectrum thereof in accordance with the frequency spectrum of the high- or low-pitched voice. This function permits realization of conversations among a plurality of speakers. Further, the MSCL system enables input of a sound data file of music, background noise, a natural voice and so forth. This is because more effective contents generation inevitably requires music, natural voice and similar sound information in addition to speech. In the MSCL system these data of such sound information are handled as additional information of synthetic speech.

With the synthetic speech editing method according to the first embodiment described above in respect of FIG. 2, non-verbal information can easily be added to synthetic speech by creating the editing procedure as a program (software), then storing the procedure in a disk unit connected to a computer of a speech synthesizer or prosody editing apparatus, or in a transportable recording medium such as a floppy disk or CD-ROM, and installing the stored procedure for each synthetic speech editing/creating session.

The above embodiment has been described mainly in connection with Japanese and some examples of application to English. In general, when a Japanese text is expressed using Japanese alphabetical letters, almost all letters are one-syllabled—this allows comparative ease in establishing correspondence between the character positions and the syllables in the text. Hence, the position of the syllable that is the prosody control object can be determined from the corresponding character position with relative ease. In languages other than Japanese, however, there are many cases where the position of the syllable in a word does not simply correspond to the position of the word in the character string as in the case of English. In the case of applying the present invention to such a language, a dictionary of that language having pronunciations of words is referred to for each word in the text to determine the position of each syllable relative to a string of letters in the word.

Second Embodiment

Since the apparatus depicted in FIG. 3 can be used for a synthetic speech editing method according to a second embodiment of the present invention, this embodiment will hereinbelow be described with reference to FIG. 3. In the prosodic feature rule database 16, as referred to previously, there are stored not only control rules for prosodic parameters corresponding to the I-layer prosodic feature control commands but also a set of I-layer prosodic feature control commands having interpreted each S-layer prosodic feature control command in correspondence thereto. Now, a description will be given of prosodic parameter control by the I-layer commands. Several examples of control of the pitch contour and duration of word utterances will be described first, then followed by an example of the creation of the S-layer commands through examination of mental tendencies of synthetic speech in each example of such control.

Figure 4:
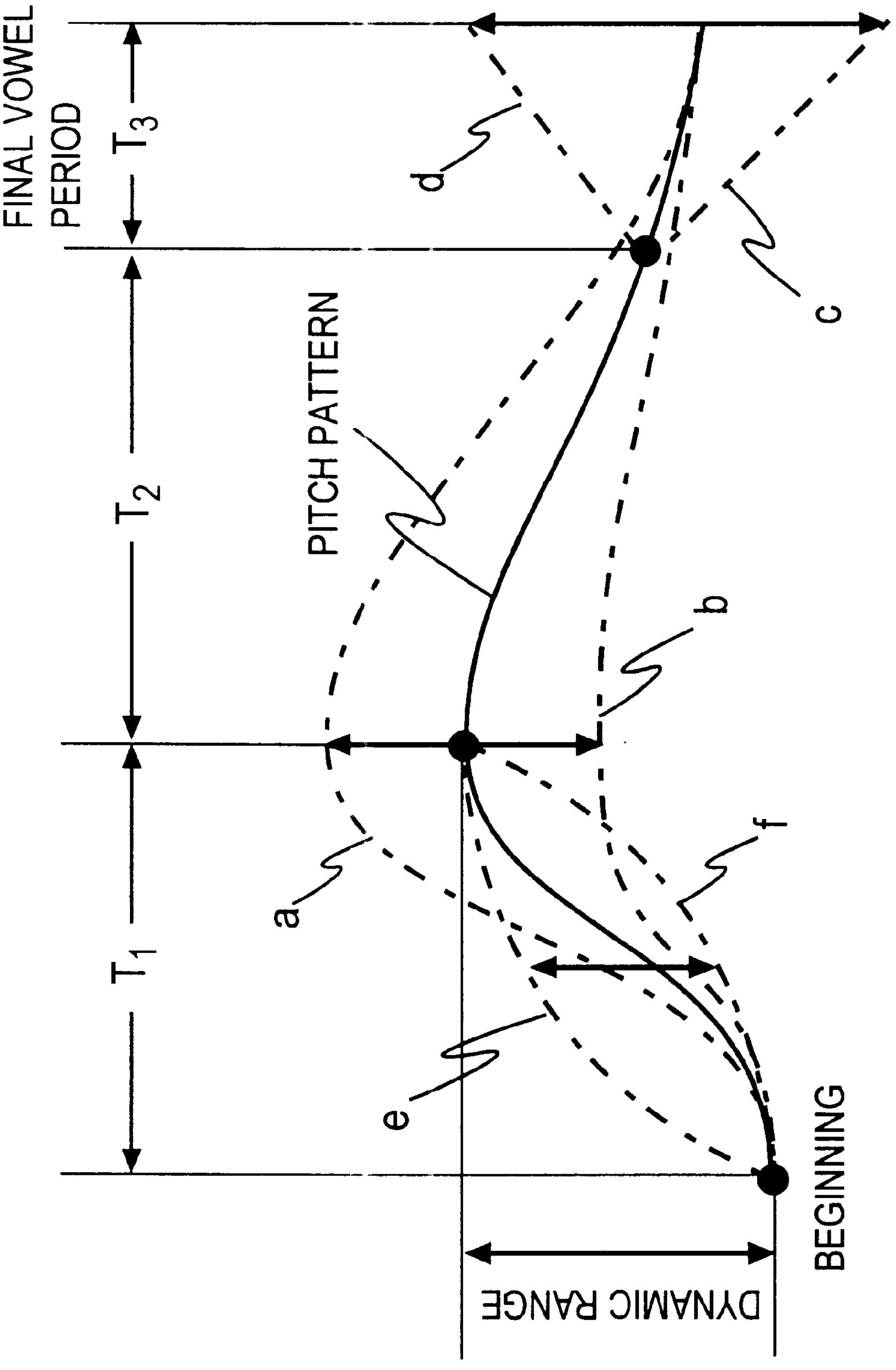
FIG. 4 is a diagram for explaining modifications of a pitch contour in a second embodiment of the present invention.

The pitch contour control method uses, as the reference for control, a range over which an accent variation or the like does not provide an auditory sense of incongruity. As depicted in FIG. 4, the pitch contour is divided into three: a section T1 from the beginning of the prosodic pattern of a word utterance (the beginning of a vowel of a first syllable) to the peak of the pitch contour, a section T2 from the peak to the beginning of a final vowel, and a final vowel section T3. With this control method, it is possible to make six kinds of modifications (a) to (f) as listed below, the modifications being indicated by the broken-line patterns a, b, c, d, e and f in FIG. 4. The solid line indicates an unmodified original pitch contour (a standard pitch contour obtained from the speech synthesis rule database 14 by a sentence structure analysis, for instance).

(a) The dynamic range of the pitch contour is enlarged.

(b) The dynamic range of the pitch contour is narrowed.

(c) The pattern of the vowel at the ending of the word utterance is made a monotonically declining pattern.

(d) The pattern of the vowel at the ending of the word utterance is made a monotonously rising pattern.

(e) The pattern of the section from the beginning of the vowel of the first syllable to the pattern peak is made upwardly projecting.

(f) The pattern of the section from the beginning of the vowel of the first syllable to the pattern peak is made downwardly projecting.

The duration control method permits two kinds of manipulations for equally (g) shortening or (h) lengthening the duration of every phoneme.

The results of investigations on mental influences by each control method will be described. Listed below are mental attitudes (non-verbal information) that listeners took in from synthesized voices obtained by modifying a Japanese word utterance according to the above-mentioned control methods (a) to (f).

(1) Toughness or positive attitude (2) Weakness or passive attitude (3) Understanding attitude (4) Questioning attitude (5) Relief or calmness (6) Uneasiness or reluctance.

Seven examinees were made to hear synthesized voices generated by modifying a Japanese word utterance "shikatanai" (which means "It can't be helped.") according to the above methods (a) to (f). FIG. 5 shows response rates with respect to the above-mentioned mental states (1) to (6) that the examinees understood from the voices they heard. The experimental results suggest that the six kinds of modifications (a) to (f) of the pitch contour depicted in FIG. 4 are recognized as the above-mentioned mental states (1) to (6) at appreciably high ratios, respectively. Hence, in the second embodiment of the invention it is determined that these modified versions of the pitch contour correspond to the mental states (1) to (6), and they are used as basic prosody control rules.

Similarly, the duration of a Japanese word utterance was lengthened and shortened to generate synthesized voices, from which listeners heard the speaker's mental states mentioned below.

(a) Lengthened: (7) Intention of clearly speaking (8) Intention of suggestively speaking (b) Shortened: (9) Hurried

(10) Urgent.

Seven examinees were made to hear synthesized voices generated by (g) lengthening and (h) shortening the duration of a prosodic pattern of a Japanese word utterance "Aoi" (which means "Blue"). FIG. 6 shows response rates with respect to the above-mentioned mental states (7) to (10) that the examinees understood from the voices they heard. In this case, too, the experimental results reveal that the lengthened duration present the speaker's intention of clearly speaking, whereas the shortened duration presents that speaker is speaking in a flurry. Hence, the lengthening and shortening of the duration are also used as basic prosody control rules corresponding to these mental states.

Based on the above experimental results, the speaker's mental states that examinees took in were investigated in the case where the modifications of the pitch contour and the lengthening and shortening of the duration were used in combination.

Seven examinees were asked to freely write the speaker's mental states that they associated with the afore-mentioned Japanese word utterance "shikatanai." FIG. 7 shows the experimental results, which suggest that various mental states could be expressed by varied combinations of basic prosody control rules, and the response rates on the respective mental states indicate that their recognition is quite common to the examinees. Further, it can be said that these mental states are created by the interaction of the influences of non-verbal information which the prosodic feature patterns have.

As described above, a wide variety of non-verbal information can be added to synthetic speech by combinations of the modifications of the pitch contour (modifications of the dynamic range and envelope) with the lengthening and shortening of the duration. There is also a possibility that desired non-verbal information can easily be created by selectively combining the above manipulations while taking into account the mental influence of the basic manipulation; this can be stored in the database 16 in FIG. 3 as a prosodic feature control rule corresponding to each mental state. It is considered that these prosody control rules are effective as the reference of manipulation for a prosody editing apparatus using GUI. Further, more expressions could be added to synthetic speech by combining, as basic prosody control rules, modifications of the amplitude pattern (the power pattern) as well as the modifications of the pitch pattern and duration.

In the second embodiment, at least one combination of a modification of the pitch contour, a modification of the power pattern and lengthening and shortening of the duration, which are basic prosody control rules corresponding to respective mental states, is prestored as a prosody control rule in the prosodic feature control rule database 16 shown in FIG. 3. In the synthesization of speech from a text, the prosodic feature control rule (that is, a combination of a modified pitch contour, a modified power pattern and lengthened and shortened durations) corresponding to the mental state desired to express is read out of the prosodic feature control rule database 16 and is then applied to the prosodic pattern of an uttered word of the text in the prosodic feature control part 17. By this, the desired expression (non-verbal information) can be added to the synthetic speech.

As is evident from the above, in this embodiment the prosodic feature control commands may be described only at the I-layer level. Of course, it is also possible to define, as the S-layer prosodic feature control commands of the MSCL description method, the prosodic feature control rules which permit varied representations and realization of respective mental states as referred to above; in this instance, speech synthesis can be performed by the apparatus of FIG. 3 based on the MSCL description as is the case with the first embodiment. The following Table 3 shows examples of description in such a case.

TABLE 3

| S-layer & I-layer | | |
|---|---|---|
| Meaning | S layer | I layer |
| Hurried | @Awate{honto} | [L](0.5) {honto} |
| Clear | @Meikaku {honto} | [L](1.5) {honto} |
| Persuasive | @Settoku {honto} | [L](1.5)[F0d](2.0){honto} |
| Indifferent | @Mukanshin {honto} | [L](0.5)[F0d](0.5){honto} |
| Reluctant | @Iyaiya {honto} | [L](1.5)[/V](2.0) {honto} |

Table 3 shows examples of five S-layer commands prepared based on the experimental results on the second embodiment and their interpretations by the corresponding I-layer commands. The Japanese word "honto" (which means "really") in the braces { } is an example of the object of control by the command. In table 3, [L] designates the utterance duration and its numerical value indicates the duration scaling factor. [FOd] designates the dynamic range of the pitch contour and its numerical value indicates the range scaling factor. [/V] designates the downward projecting modification of the pitch contour from the beginning to the peak and its numerical value indicates the degree of such modification.

As described above, according to this embodiment, the prosodic feature control command for correcting a prosodic parameter is described in the input text and the prosodic parameter of the text is corrected by a combination of modified prosodic feature patterns specified by the prosody control rule corresponding to the prosodic feature control command described in the text. The prosody control rule specifies a combination of variations in the speech power pattern, pitch contour and utterance duration and, if necessary, the shape of time-varying pattern of the prosodic parameter as well.

To specify the prosodic parameter value takes two forms: relative control for changing or correcting the prosodic parameter resulting from the "synthesis-by-rule" and absolute control form making an absolute correction to the parameter. Further, prosodic feature control commands in frequent use are combined for easy access thereto when they are stored in the prosody control rule database 16, and they are used as new prosodic feature control commands to specify prosodic parameters. For example, a combination of basic control rules is determined in correspondence to each prosodic feature control command of the S layer in the MSCL system and is then prestored in the prosody control rule database 16. Alternatively, only the basic prosody control rules are prestored in the prosody control rule database 16, and one or more prosodic feature control commands of the I layer corresponding to each prosodic feature control command of the S layer is used to specify and read out a combination of the basic prosody control rules from the database 16. While the second embodiment has been described above to use the MSCL method to describe prosody control of the text, other description methods may also be used.

The second embodiment is based on the assumption that combinations of specific prosodic features are prosody control rules. It is apparent that the second embodiment is also applicable to control of prosodic parameters in various natural languages as well as in Japanese.

With the synthetic speech editing method according to the second embodiment described above, non-verbal information can easily be added to synthetic speech by building the editing procedure as a program (software), storing it on a computer-connected disk unit of a speech synthesizer or prosody editing apparatus or on a transportable recording medium such as a floppy disk or CD-ROM, and installing it at the time of synthetic speech editing/creating operation.

Third Embodiment

Incidentally, in the case where prosodic feature control commands are inserted in a text via the text/prosodic feature command input part 11 in FIG. 3 through the use of the MSCL notation by the present invention, it would be convenient if it could be confirmed visually how the utterance duration, pitch contour and amplitude pattern of the synthetic speech of the text are controlled by the respective prosodic feature control commands. Now, a description will be given below of an example of a display of the prosodic feature pattern of the text controlled by the commands, and a configuration for producing the display.

First, experimental results concerning the prosodic feature of the utterance duration will be described. With the duration lengthened, the utterance sounds slow, whereas when the duration is short, the utterance sounds fast. In the experiments, a Japanese word "Urayamashii" (which means "envious") was used. A plurality of length-varied versions of this word, obtained by changing its character spacing variously, were written side by side. Composite or synthetic tones or utterances of the word were generated which had normal, long and short durations, respectively, and 14 examinees were asked to vote upon which utterances they thought would correspond to which length-varied versions of the Japanese word. The following results, substantially as predicted, were obtained.

Short duration: Narrow character spacing (88%)

Long duration: Wide character spacing (100%).

Figure 8:
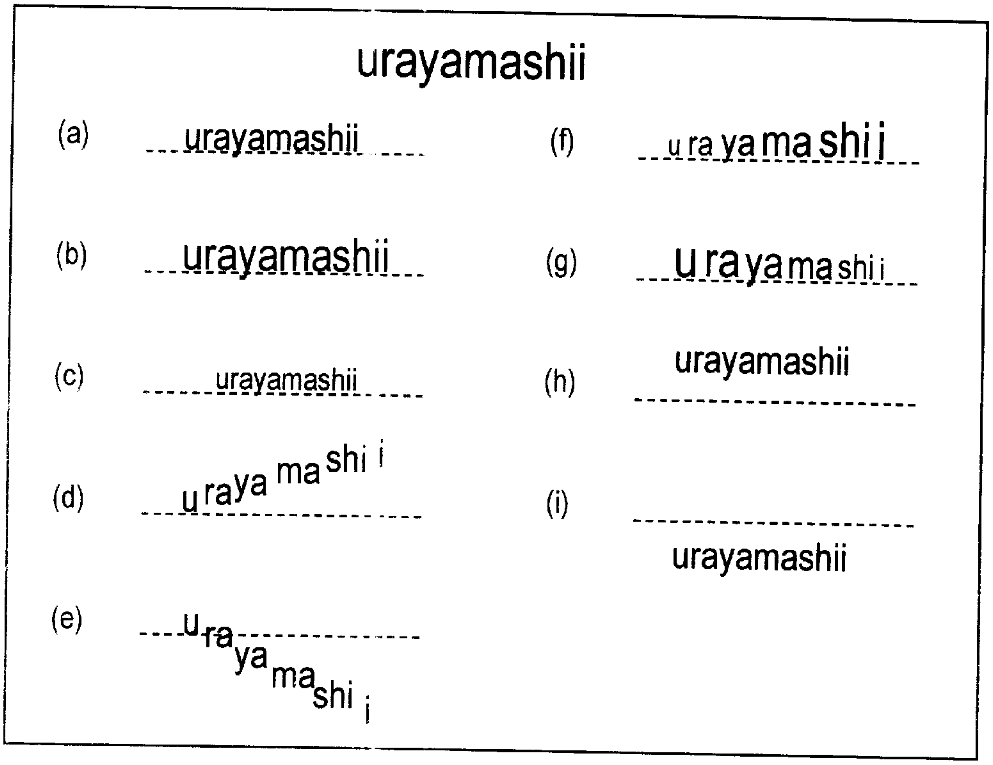
FIG. 8 is a table depicting examples of commands used in hearing tests concerning prosodic features of the pitch and the power in a third embodiment of the present invention.

Next, a description will be given of experimental results obtained concerning the prosodic features of the fundamental frequency (pitch) and amplitude value (power). Nine variations of the same Japanese word utterance "Urayamashii" as used above were synthesized with their pitches and powers set as listed below, and 14 examinees were asked to vote upon which of nine character strings (a) to (i) in FIG. 8 they thought would correspond to which of the synthesized utterances. The results are shown below in Table 4.

TABLE 4

Prosodic features & matched notations

| Power | Pitch | Maximum votes for character strings (%) | |
|---|---|---|---|
| (1) Medium | Medium | (a) | |
| (2) Small | High | (i) | 93% |
| (3) Large | High | (b) | 100% |
| (4) | High | (h) | 86% |
| (5) Small | | (a) | 62% |
| (6) Small→Large | | (f) | 86% |
| (7) Large→Small | | (g) | 93% |
| (8) | Low→High | (d) or (f) | 79% |
| (9) | High→Low | (e) | 93% |

Figure 9:
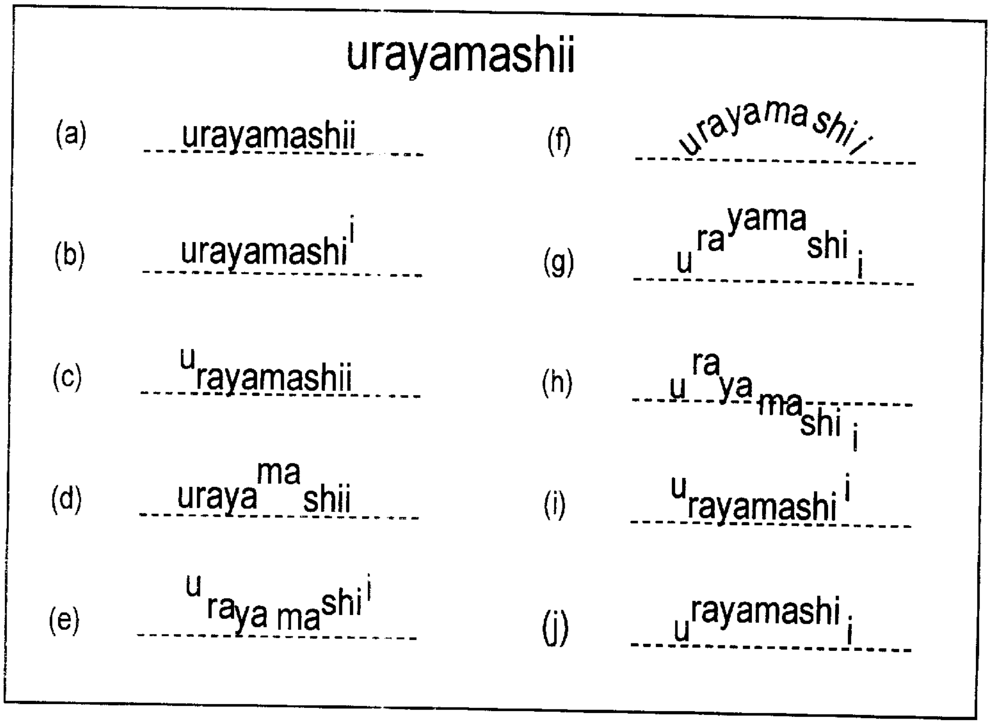
FIG. 9 is a table depicting examples of commands used in hearing tests concerning the dynamic range of the pitch in the third embodiment.

Next, experimental results concerning the intonational variation will be described. The intonation represents the value (the dynamic range) of a pitch variation within a word. When the intonation is large, the utterance sounds "strong, positive", and with a small intonation, the utterance sounds "weak, passive". Synthesized versions of the Japanese word utterance "Urayamashii" were generated with normal, strong and weak intonations, and evaluation tests were conducted as to which synthesized utterances matched with which character strings shown in FIG. 9. As a result, the following conclusion is reached.

Strong intonation→The character position is changed with the pitch pattern (a varying time sequence), thereby further increasing the inclination (71%).

Weak intonation The character positions at the beginning and ending of the word are raised (43%).

Figure 10A:
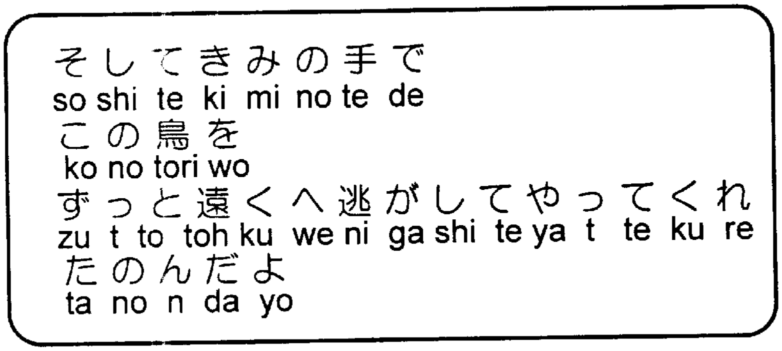
FIG. 10A is a diagram showing an example of an input Japanese sentence in the third embodiment.
Figure 10B:
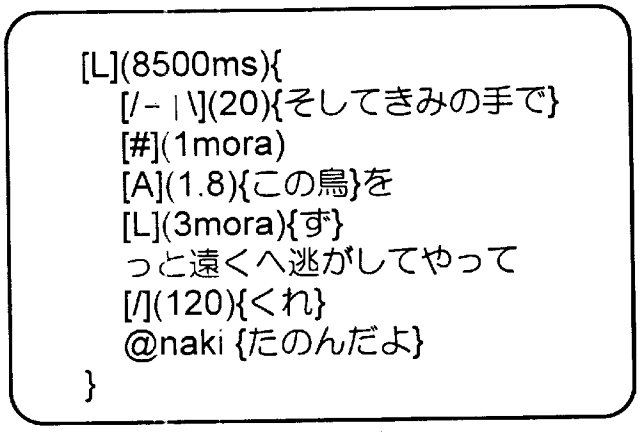
FIG. 10B is a diagram showing an example of its MSCL description.
Figure 10C:
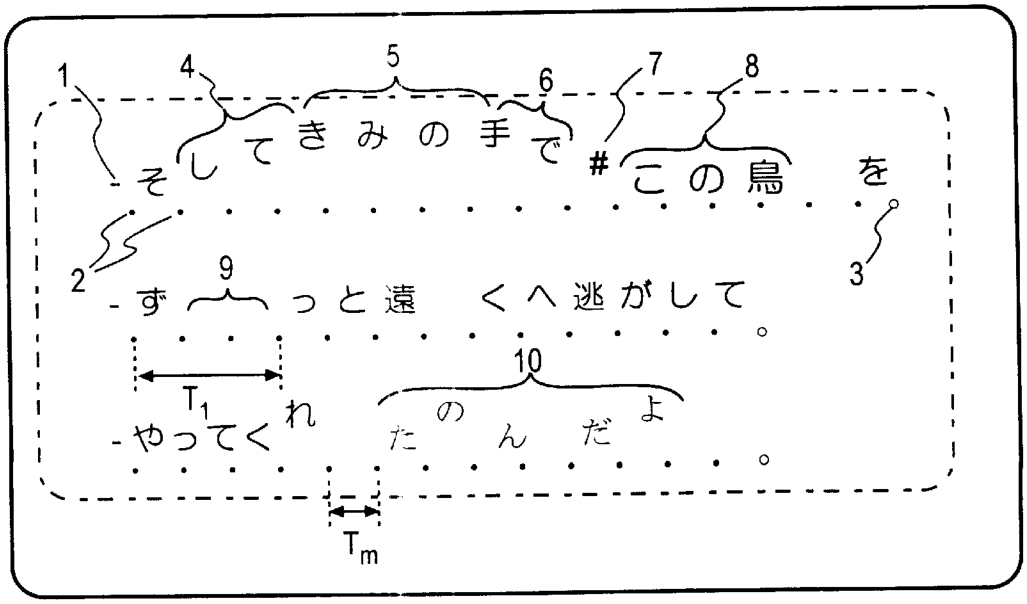
FIG. 10C is a diagram showing an example of a display of the effect by the commands according to the third embodiment.

In FIGS. 10A, 10B and 10C there are depicted examples of displays of a Japanese sentence input for the generation of synthetic speech, a description of the input text mixed with prosodic feature control commands of the MSCL notation inserted therein, and the application of the above-mentioned experimental results to the inserted prosodic feature control commands.

The input Japanese sentence of FIG. 10A means "I'm asking you, please let the bird go far away from your hands." The Japanese pronunciation of each character is shown under it.

In FIG. 10B, [L] is a utterance duration control command, and the time subsequent thereto is an instruction that the entire sentence be completed in 8500 ms. [/-|\] is a pitch contour control command, and the symbols show a rise (\), flattening (-), an anchor (|) and a declination (\) of the pitch contour. The numerical value (2) following the pitch contour control command indicates that the frequency is varied at a changing ratio of 20 Hz per phoneme, and it is indicated that the pitch contour of the syllable of the final character is declined by the anchor "I". [#] is a pause inserting command, by which a silent duration of about 1 mora is inserted. [A] is an amplitude value control command, by which the amplitude value is made 1.8 times larger than before, that is, than "konotori" (which means "the bird"). These commands are those of the I layer. On the other hand, [@naki] is an S-layer command for generating an utterance with a feeling of sorrow.

A description will be given, with reference to FIG. 10C, of an example of a display in the case where the description scheme or notation based on the above-mentioned experiments is applied to the description shown in FIG. 10B. The input Japanese characters are arranged in the horizontal direction. A display 1 "-" provided at the beginning of each line indicates the position of the pitch frequency of the synthesized result prior to the editing operation. That is, when no editing operation is performed concerning the pitch frequency, the characters in each line are arranged with the position of the display [-] held at the same height as that of the center of each character. When the pitch frequency is changed, the height of display at the center of each character changes relative to "-" according to the value of the changed pitch frequency.

The dots "." indicated by reference numeral 2 under the character string of each line represent an average duration $T_m$ (which indicates one-syllable length, that is, 1 mora in the case of Japanese) of each character by their spacing. When no duration scaling operation is involved, each character of the display character string is given moras of the same number as that of syllables of the character. When the utterance duration is changed, the character display spacing of the character string changes correspondingly. The symbol "○" indicated by reference numeral 3 at the end of each line represents the endpoint of each line; that is, this symbol indicates that the phoneme continues to its position.

The three characters indicated by reference numeral 4 on the first line in FIG. 10C are shown to have risen linearly from the position of the symbol "-" identified by reference numeral 1, indicating that this is based on the input MSCL command "a rise of the pitch contour very 20 Hz." Similarly, the four characters identified by reference numeral 5 indicate a flat pitch contour, and the two character identified by reference numeral 6 a declining pitch contour.

The symbol "#" denoted by reference numeral 7 indicates the insertion of a pause. The three characters denoted by reference numeral 8 are larger in size than the characters preceding and following them—this indicates that the amplitude value is on the increase.

The 2-mora blank identified by reference numeral 9 on the second line indicates that the immediately preceding character continues by T1 (3 moras=$3T_m$) under the control of the duration control command.

The five characters indicated by reference numeral 10 on the last line differ in font from the other characters. This example uses a fine-lined font only for the character string 10 but Gothic for the others. The fine-lined font indicates the introduction of the S-layer commands. The heights of the characters indicate the results of variations in height according to the S-layer commands.

Figure 11:
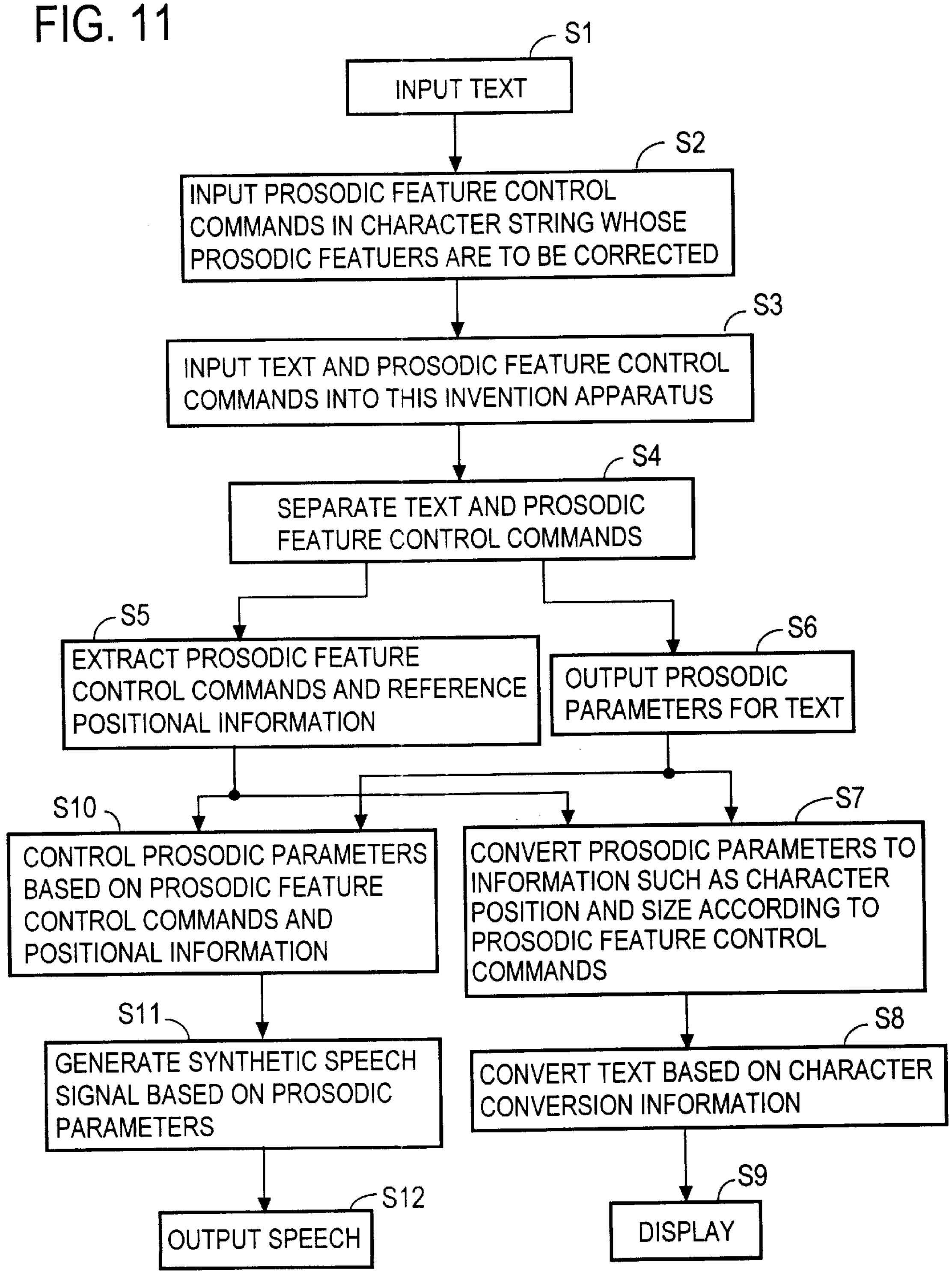
FIG. 11 is a flowchart showing editing and display procedures according to the third embodiment.

FIG. 11 depicts an example of the procedure described above. In the first place, the sentence shown in FIG. 10A, for instance, is input (S1), then the input sentence is displayed on the display, then prosodic feature control commands are inserted in the sentence at the positions of the characters where corrections to the prosodic features a obtainable by the usual (conventional) synthesis-by-rule while observing the sentence on the display, thereby obtaining, for example, the information depicted in FIG. 10B, that is, synthetic speech control description language information (S2).

This information, that is, information with the prosodic feature control commands incorporated in the Japanese text, is input into an apparatus embodying the present invention (S3).

The input information is processed by separating means to separate it into the Japanese text and the prosodic feature control commands (S4). This separation is performed by determining whether respective codes belong to the prosodic feature control commands or the Japanese text through the use of the MSCL description scheme and a wording analysis scheme.

The separated prosodic feature control commands are analyzed to obtain information about their properties, reference positional information about their positions (character or character string) on the Japanese text, and information about the order of their execution (S5). In the case of executing the commands in the order in which they are obtained, the information about the order of their execution becomes unnecessary. Then, the Japanese text separated in step S4 is subjected to a Japanese syntactic structure analysis to obtain prosodic parameters based on the conventional by-rule-synthesis method (S6).

The prosodic parameters thus obtained are converted to information on the positions and sizes of characters through utilization of the prosodic feature control commands and their reference positional information (S7). The thus converted information is used to convert the corresponding characters in the Japanese text separated in step S4 (S8), and they are displayed on the display to provide a display of, for example, the Japanese sentence (except the display of the pronunciation) shown in FIG. 10C (S9).

The prosodic parameters obtained in step S6 are controlled by referring to the prosodic feature control commands and the positional information both obtained in step S5 (S10). Based on the controlled prosodic parameters, a speech synthesis signal for the Japanese text separated in step S4 is generated (S11), and then the speech synthesis signal is output as speech (S12). It is possible to make a check to see if the intended representation, that is, the MSCL description has been correctly made, by hearing the speech provided in step S12 while observing the display provided in step S9.

Figure 12:
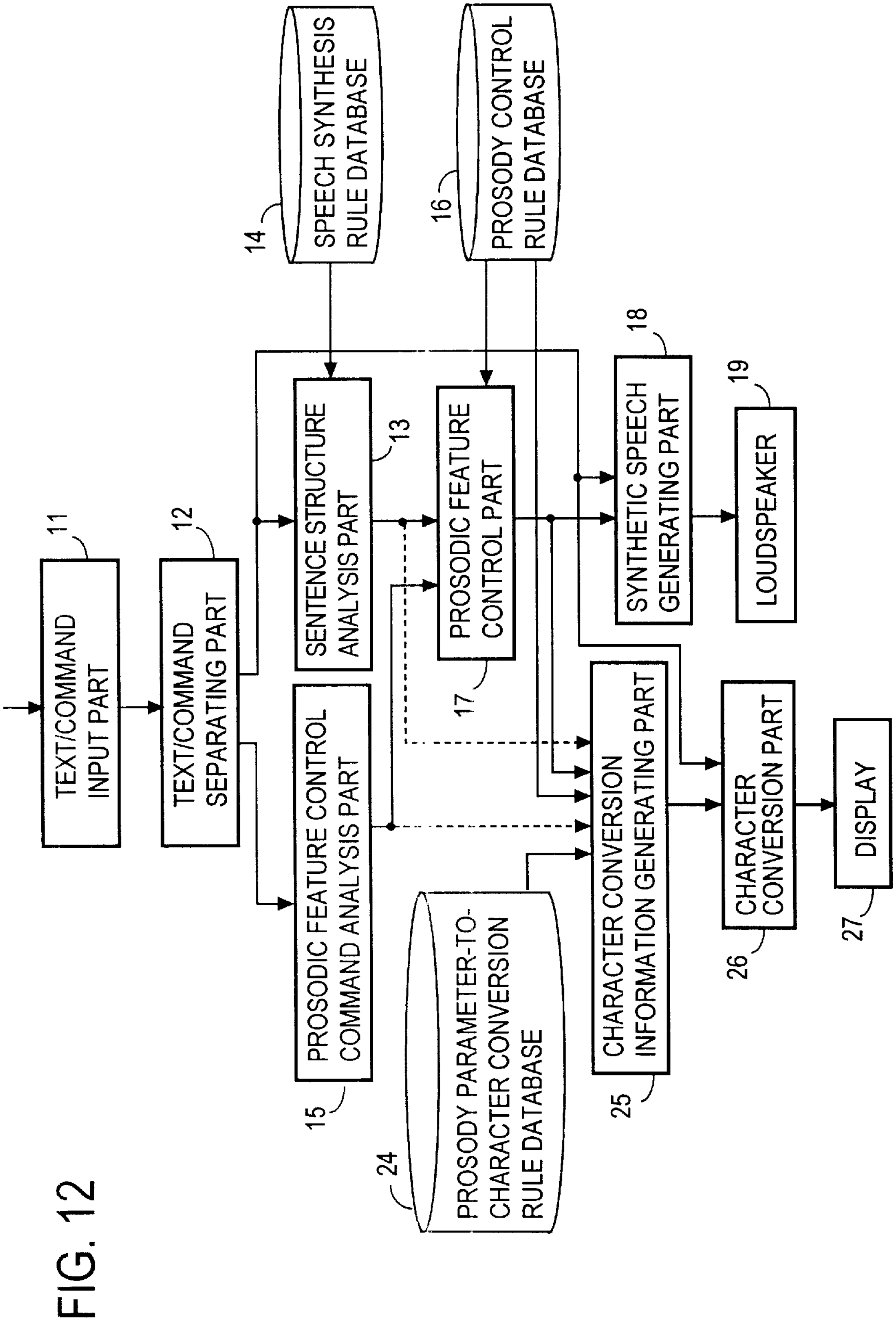
FIG. 12 is block diagram illustrating a synthetic speech editing apparatus according to the third embodiment

FIG. 12 illustrates in block form the functional configuration of a synthetic speech editing apparatus according to the third embodiment of the present invention. MSCL-described data, shown in FIG. 10B, for instance, is input via the text/command input part 11. The input data is separated by the text/command separating part (or lexical analysis part) 12 into the Japanese text and prosodic feature control commands. The Japanese text is provided to the sentence structure analysis part 13, wherein prosodic parameters are created by referring to the speech synthesis rule database 14. On the other hand, in the prosodic feature control command analysis part (or parsing part) 15 the separated prosodic feature control commands are analyzed to extract their contents and information about their positions on the character string (the text). Then, in the prosodic feature control part 17 the prosodic feature control commands and their reference position information are used to modify the prosodic parameters from the syntactic structure analysis part 13 by referring to the MSCL prosody control rule database 16. The modified prosodic parameters are used to generate the synthetic speech signal for the separated Japanese text in the synthetic speech generating part 18, and the synthetic speech signal is output as speech via the loudspeaker 19.

On the other hand, the prosodic parameters modified in the prosodic feature control part 17 and rules for converting the position and size of each character of the Japanese text to character conversion information are prestored in a database 24. By referring to the database 24, the modified prosodic parameters from the prosodic feature control part 17 are converted to the above-mentioned character conversion information in a character conversion information generating part 25. In a character conversion part 26 the character conversion information is used to convert each character of the Japanese text, and the thus converted Japanese text is displayed on a display 27.

The rules for converting the MSCL control commands to character information referred to above can be changed or modified by a user. The character height changing ratio and the size and display color of each character can be set by the user. Pitch frequency fluctuations can be represented by the character size. The symbols "." and "-" can be changed or modified at user's request. When the apparatus of FIG. 12 has such a configuration as indicated by the broken lines wherein the Japanese text from the syntactic structure analysis part 13 and the analysis result obtained in the prosodic feature control command analysis part 15 are input into the character conversion information generating part 25, the database 24 has stored therein rules for prosodic feature control command-to-character conversion rules in place of the prosodic parameter-to-character conversion rules and, for example, the prosodic feature control commands are used to change the pitch, information for changing the character height correspondingly is provided to the corresponding character of the Japanese text, and when the prosodic feature control commands are used to increase the amplitude value, character enlarging information is provided to the corresponding part of the Japanese text. Incidentally, when the Japanese text is fed intact into the character conversion part 26, such a display as depicted in FIG. 10A is provided on the display 27.

It is considered that the relationship between the size of the display character and the loudness of speech perceived in association therewith and the relationship between the height of the character display position and the pitch of speech perceived in association therewith are applicable not only to Japanese but also to various natural languages. Hence, it is apparent that the third embodiment of the present invention can equally be applied to various natural languages other than Japanese. In the case where the representation of control of the prosodic parameters by the size and position of each character as described above is applied to individual natural languages, the notation shown in the third embodiment may be used in combination with a notation that fits character features of each language.

With the synthetic speech editing method according to the third embodiment described above with reference to FIG. 11, non-verbal information can easily be added to synthetic speech by building the editing procedure as a program (software), storing it on a computer-connected disk unit of a speech synthesizer or prosody editing apparatus or on a transportable recording medium such as a floppy disk or CD-ROM, and installing it at the time of synthetic speech editing/creating operation.

While the third embodiment has been described to use the MSCL scheme to add non-verbal information to synthetic speech, it is also possible to employ a method which modifies the prosodic features by an editing apparatus with GUI and directly processes the prosodic parameters provided from the speech synthesis means.

EFFECT OF THE INVENTION

According to the synthetic speech message editing/creating method and apparatus of the first embodiment of the present invention, when the synthetic speech by "synthesis-by-rule" sounds unnatural or monotonous and hence dull to a user, an operator can easily add desired prosodic parameters to a character string whose prosody needs to be corrected, by inserting prosodic feature control commands in the text through the MSCL description scheme.

With the use of the relative control scheme, the entire synthetic speech need not be corrected and only required corrections are made to the result by the "synthesis-by-rule" only at required places—this achieves a large saving of work involved in the speech message synthesis.

Further, since the prosodic feature control commands generated based on prosodic parameters available from actual speech or display type synthetic speech editing apparatus are stored and used, even an ordinary user can easily synthesize a desired speech message without requiring any particular expert knowledge on phonetics.

According to the synthetic speech message editing/creating method and apparatus of the second embodiment of the present invention, since sets of prosodic feature control commands based on combinations of plural kinds of prosodic pattern variations are stored as prosody control rules in the database in correspondence to various kinds of non-verbal information, varied non-verbal information can be added to the input text with ease.

According to the synthetic speech message editing/creating method and apparatus of the third embodiment of the present invention, the contents of manipulation (editing) can visually checked depending on how characters subjected to prosodic feature control operation (editing) are arranged—this permits more effective correcting operations. In the case of editing a long sentence, a character string that needs to be corrected can easily be found without checking the entire speech.

Since editing method is common to a character printing method, no particular printing method is necessary. Hence, the synthetic speech editing system is very simple.

By equipping the display means with a function for accepting a pointing device to change or modify the character position information or the like, it is possible to produce the same effect as in the editing operation using GUI.

Moreover, since the present invention allows ease in converting conventional detailed displays of prosodic features, it is also possible to meet the need for dose control. The present invention enables an ordinary user to effectively create a desired speech message.

It is evident that the present invention is applicable not only to Japanese but also other natural languages, for example, German, French, Italian, Spanish and Korean.

It will be apparent that many modifications and variations may be effected without departing from the scope of the novel concepts of the present invention.

What is claimed is:

1. A method for editing non-verbal information of a speech message synthesized by rules in correspondence to a text, said method comprising the steps of:

(a) inserting in said text, at the position of a character or character string to be added with non-verbal information, a prosodic feature control command of a semantic layer (hereinafter referred to as an S layer) and/or an interpretation layer (hereinafter referred to as an I layer) of a multi-layered description language so as to effect prosody control corresponding to said non-verbal information, said multi-layered description language being composed of said S and I layers and a parameter layer (hereinafter referred to as a P layer), said P layer being a group of controllable prosodic parameters including at least pitch and power, said I layer being a group of prosodic feature control commands for specifying details of control of said prosodic parameters of said P layer, said S layer being a group of prosodic feature control commands each represented by a phrase or word indicative of an intended meaning of non-verbal information, for executing a command set composed of at least one prosodic feature control command of said I layer, and the relationship between each prosodic feature control command of said S layer and said set of prosodic feature control commands of said I layer and prosody control rules indicating details of control of said prosodic parameters of said P layer by said prosodic feature control commands of said I layer being prestored in a prosody control rule database;

(b) extracting from said text a prosodic parameter string of speech synthesized by rules;

(c) controlling that one of said prosodic parameters of said prosodic parameter string corresponding to said character or character string to be added with said non-verbal information, by referring to said prosody control rules stored in said prosody control rule database; and (d) synthesizing speech from said prosodic parameter string containing said controlled prosodic parameter and for outputting a synthetic speech message.

2. The method of claim 1, wherein said prosodic parameter control in said step (c) is to change values of said parameters relative to said prosodic parameter string obtained in said step (b).

3. The method of claim 1, wherein said prosodic parameter control in said step (c) is to change specified absolute values of said parameters with respect to said prosodic parameter string obtained in said step (b).

4. The method of any one of claims 1 through 3, wherein said prosodic parameter control in said step (c) is to perform at least one of specifying the value of at least one of prosodic parameters for the amplitude, fundamental frequency and duration of the utterance concerned and specifying the shape of a time-varying pattern of each prosodic parameter.

5. The method of any one of claims 1 through 3, wherein said set of prosodic feature control commands of said I layer, which define control of physical quantities of prosodic parameters of said P layer, is used as one prosodic feature control command of said S layer that represents the meaning of said non-verbal information.

6. The method of any one of claims 1 through 3, wherein said step (c) is a step of detecting the positions of a phoneme and a syllable corresponding to said character or character string with reference to a dictionary in the language of the text and processing them by said prosodic feature control commands.

7. The method of any one of claims 1 through 3, wherein said P layer is a cluster of prosodic parameters to be controlled, said prosodic feature control commands of said S layer are each cluster of words or phrases representing meanings of various pieces of non-verbal information and said prosodic feature control commands of said I layer are each a command that interprets said each prosodic feature control command of said S layer and defines the prosodic parameters of said P layer to be controlled and the control contents.

8. A method for editing non-verbal information by adding information of mental states to a speech message synthesized by rules in correspondence to a text, said method comprising the steps of:

(a) extracting from said text a prosodic parameter string of speech synthesized by rules;

(b) correcting that one of prosodic parameters of said prosodic parameter string corresponding to the character or character string to be added with said non-verbal information, through the use of at least one of basic prosody control rules defined by modifications of at least one of pitch patterns, power patterns and durations characteristic of a plurality of predetermined pieces of non-verbal information, respectively, said basic prosody control rules being stored in a memory in correspondence to predetermined mental states, respectively; and (c) synthesizing speech from said prosodic parameter string containing said corrected prosodic parameter and outputting a synthetic speech message;

wherein a multi-layered description language is defined which comprises a semantic layer (hereinafter referred to as an S layer) composed of prosodic feature control commands each represented by a word or phrase indicative of an intended meaning of predetermined non-verbal information, an interpretation layer (hereinafter referred to as an I layer) composed of prosodic feature control commands each defining a physical meaning of control of prosodic parameters by one prosodic feature control command of said S layer and a parameter layer composed of a cluster of prosodic parameters of a control object, said method further comprising a step of describing in said multi-layered description language, the prosodic feature control command corresponding to said non-verbal information in said text at the position of said character or character string to be added with said non-verbal information.

9. A method for editing non-verbal information by adding information of mental states to a speech message synthesized by rules in correspondence to a text, said method comprising the steps of:

(a) analyzing said text to extract therefrom a prosodic parameter string based on synthesis-by-rule speech;

(b) correcting that one of prosodic parameters of said prosodic parameter string corresponding to the character or character string to be added with said non-verbal information, through the use of modifications of at least one of pitch patterns, power patterns and durations based on prosodic parameters characteristic of said non-verbal information, said basic prosody control rules being stored in a memory in correspondence to predetermined mental states, respectively; wherein said correcting step is performed following a prosodic feature control command described in said text in correspondence to said character or character string to be added with said non-verbal information;

(c) synthesizing speech by said corrected prosodic parameter;

(d) converting said modification information of said prosodic parameter to character conversion information such as the position, size, typeface and display color of each character in said text based on relationships between each one of combinations of values of different prosodies to effect a desired one of mental states and at least one of size and position of characters most matched as a visual impression of the mental state and between each one of variation patterns of at least one of prosody to effect another desired one of mental states and at least one of size and position of characters most matched as another desired visual impression of the mental state, these relationships being obtained through experiments; and (e) converting the characters of said text based on said character conversion information and displaying them accordingly;

wherein a multi-layered description language is defined which comprises a semantic layer (hereinafter referred to as an S layer) composed of prosodic feature control commands each represented by a word or phrase indicative of an intended meaning of predetermined non-verbal information, an interpretation layer (hereinafter referred to as an I layer) composed of prosodic feature control commands each defining a physical meaning of control of prosodic parameters by one prosodic feature control command of said S layer and a parameter layer composed of a cluster of prosodic parameters of a control object, said method further comprising a step of describing in said multi-layered description language, the prosodic feature control command corresponding to said non-verbal information in said text at the position of said character or character string to be added with said non-verbal information.

10. A synthetic speech message editing/creating apparatus comprising:

a text/prosodic feature control command input part into which a prosodic feature control command to be inserted in an input text is input, said phonological control command being described in a multi-layered description language composed of semantic, interpretation and parameter layers (hereinafter referred to simply as an S, an I and a P layer, respectively), said P layer being a group of controllable prosodic parameters including at least pitch and power, said I layer being a group of prosodic feature control commands for specifying details of control of said prosodic parameters of said P layer, and said S layer being a group of prosodic feature control commands each represented by a phrase or word indicative of an intended meaning of non-verbal information, for executing command sets each composed of at least one prosodic feature control command of said I layer;

a text/prosodic feature control command separating part for separating said prosodic feature control command from said text;

a speech synthesis information converting part for generating a prosodic parameter string from said separated text based on a "synthesis-by-rule" method;

a prosodic feature control command analysis part for extracting, from said separated prosodic feature control command, information about its position in said text;

a prosodic feature control part for controlling and correcting said prosodic parameter string based on said extracted position information and said separated prosodic feature control command; and speech synthesis part for generating synthetic speech based on said corrected prosodic parameter string from said prosodic feature control part.

11. The apparatus of claim 10 further comprising:

Input speech analysis part for analyzing input speech containing non-verbal information to obtain prosodic parameters;

a prosodic feature/prosodic feature control command conversion part for converting said prosodic parameters in said input speech to a set of prosodic feature control commands; and a prosody control rule database for storing said set of prosodic feature control commands in correspondence to said non-verbal information.

12. The apparatus of claim 11, which further comprises a display type synthetic speech editing part provided with a display screen and GUI means, and wherein said display type synthetic speech editing part reads out a set of prosodic feature control commands corresponding to desired non-verbal information from said prosody control rule database and into said prosodic feature/prosodic feature control command conversion part, then displays said read-out set of prosodic feature control commands on said display screen, and corrects said set of prosodic feature control commands by said GUI, thereby updating the corresponding prosodic feature control command set in said prosody control rule database.

13. A recording medium having recorded thereon a procedure for editing/creating non-verbal information of a synthetic speech message by rules, said procedure comprising the steps of:

(a) describing a prosodic feature control command corresponding to said non-verbal information in a multi-layered description language in an input text at the position of a character or character string to be added with said non-verbal information, said multi-layered description language being composed of a semantic layer (hereinafter referred to as an S layer), an interpretation layer (hereinafter referred to as an I layer) and a parameter layer (hereinafter referred to as a P layer);

(b) extracting from said text a prosodic parameter string of speech synthesized by rules;

(c) controlling that one of said prosodic parameter string corresponding to said character or character string to be added with said non-verbal information, by said prosodic feature control command; and (d) synthesizing speech from said prosodic parameter string containing said controlled prosodic parameter and outputting a synthetic speech message.

* * * * *